March 12, 1935.　　　R. L. PROBST　　　1,994,254
ARMATURE WINDING MACHINE
Filed Sept. 3, 1932　　　4 Sheets-Sheet 1

Inventor
Robert L. Probst
by Rupsey & Kingsland
His Attorneys.

March 12, 1935.   R. L. PROBST   1,994,254
ARMATURE WINDING MACHINE
Filed Sept. 3, 1932   4 Sheets-Sheet 2
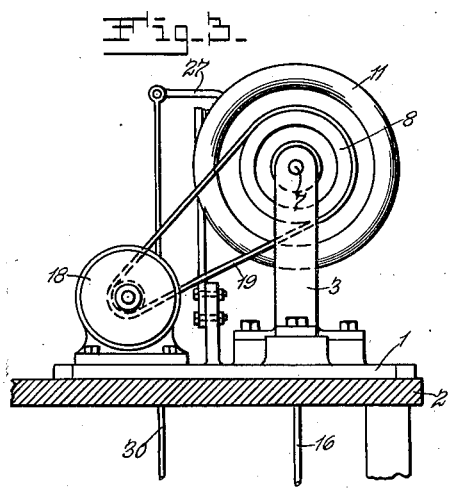
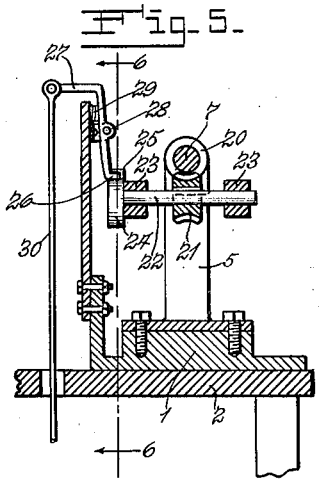
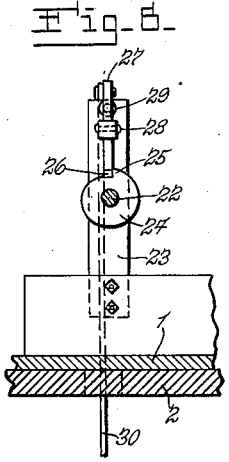
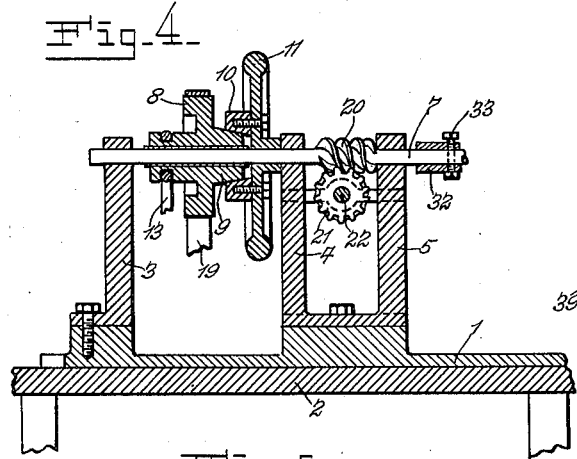
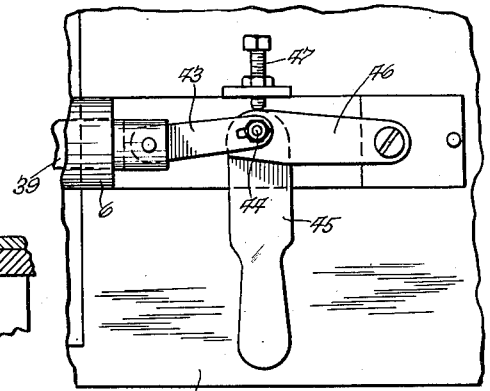
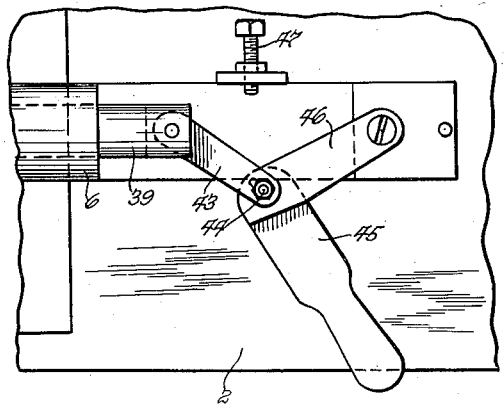
Inventor
Robert L. Probst
His Attorneys March 12, 1935.　　　R. L. PROBST　　　1,994,254
ARMATURE WINDING MACHINE
Filed Sept. 3, 1932　　　4 Sheets-Sheet 3

Inventor
Robert L. Probst
by Rippey & Kingsland
His Attorneys.

March 12, 1935. R. L. PROBST 1,994,254
ARMATURE WINDING MACHINE
Filed Sept. 3, 1932 4 Sheets-Sheet 4
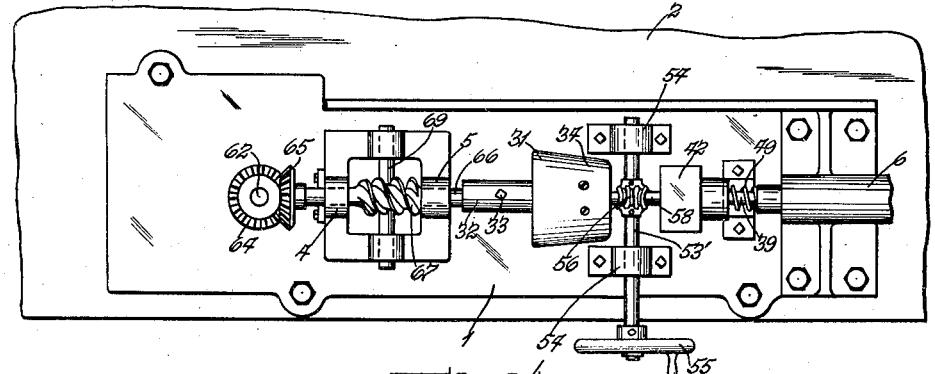
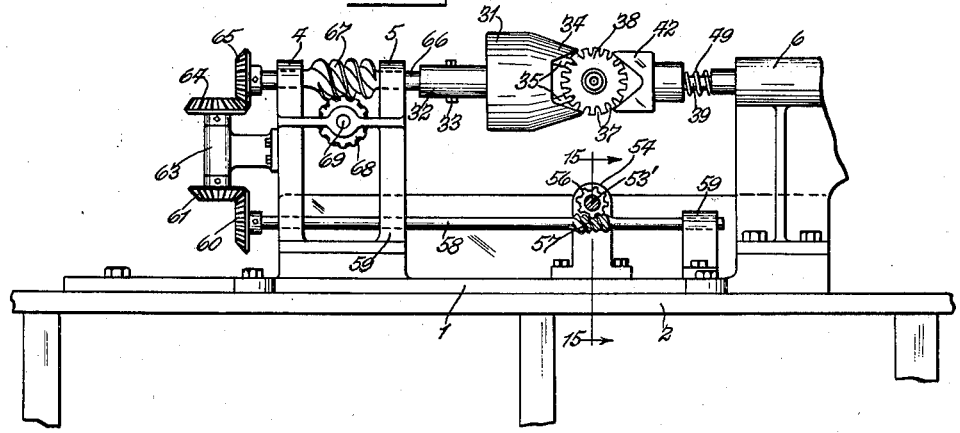
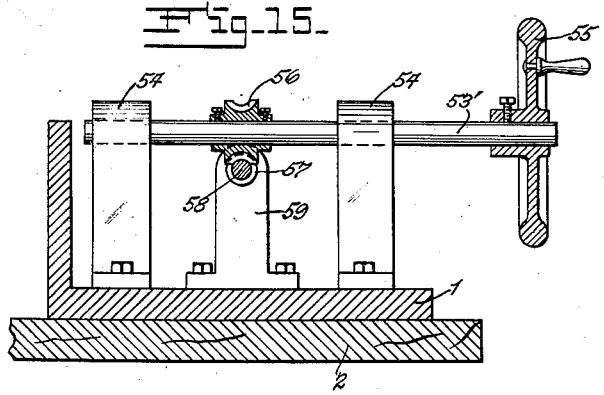

Patented Mar. 12, 1935

1,994,254

UNITED STATES PATENT OFFICE 1,994,254

ARMATURE WINDING MACHINE

Robert L. Probst, Clayton, Mo.

Application September 3, 1932, Serial No. 631,656

6 Claims. (Cl. 242—13)

This invention relates to armature winding machines.

The invention comprises spaced gripper members mounted on axially alined rotary shafts, in combination with mechanism for rotating one of said shafts exactly uniform distances of rotation intermittently in order to wind the wires about the armature with uniformity and precision, and construction embodied in connection with one of said gripper members for placing the wires in the proper grooves in the armature automatically and as an incident to rotation of the gripper members and the armature.

An object of the invention is to provide an improved machine for winding armatures and the like and embodying the features and mechanisms mentioned, together with other improved features of construction and arrangement herein disclosed.

Other objects and advantages of the invention will appear from the following description, reference being made to the annexed drawings, in which—

Fig. 3 is an end elevation of the machine, the table being in section.

Fig. 4 is a longitudinal sectional view on the line 4—4 of Fig. 1.

Fig. 5 is a transverse sectional view on the line 5—5 of Fig. 1.

Fig. 6 is a sectional view on the line 6—6 of Fig. 1, showing details of the device for stopping rotation of the armature in the exact position from which rotation of the armature started.

Fig. 7 is a plan view, showing a toggle device set to hold the gripper members engaged with the armature.

Fig. 8 is a similar view of the toggle device operated to release the gripper members from the armature.

Fig. 13 is a plan view of a manually operated machine embodying features of the present invention.

Fig. 14 is a side elevation of said machine.

Fig. 15 is an enlarged vertical cross sectional view on the line 15—15 of Fig. 14.

Figure 1:
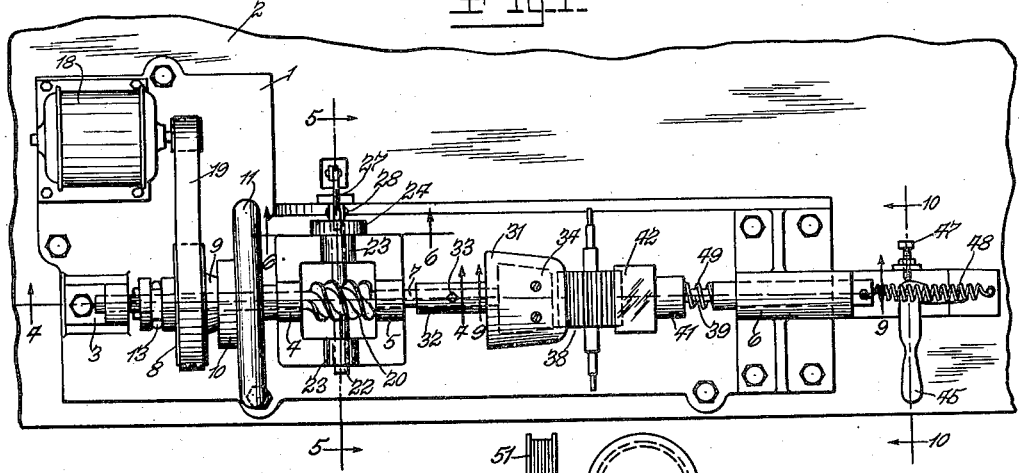
Fig. 1 is a plan view of my improved machine.
Figure 2:
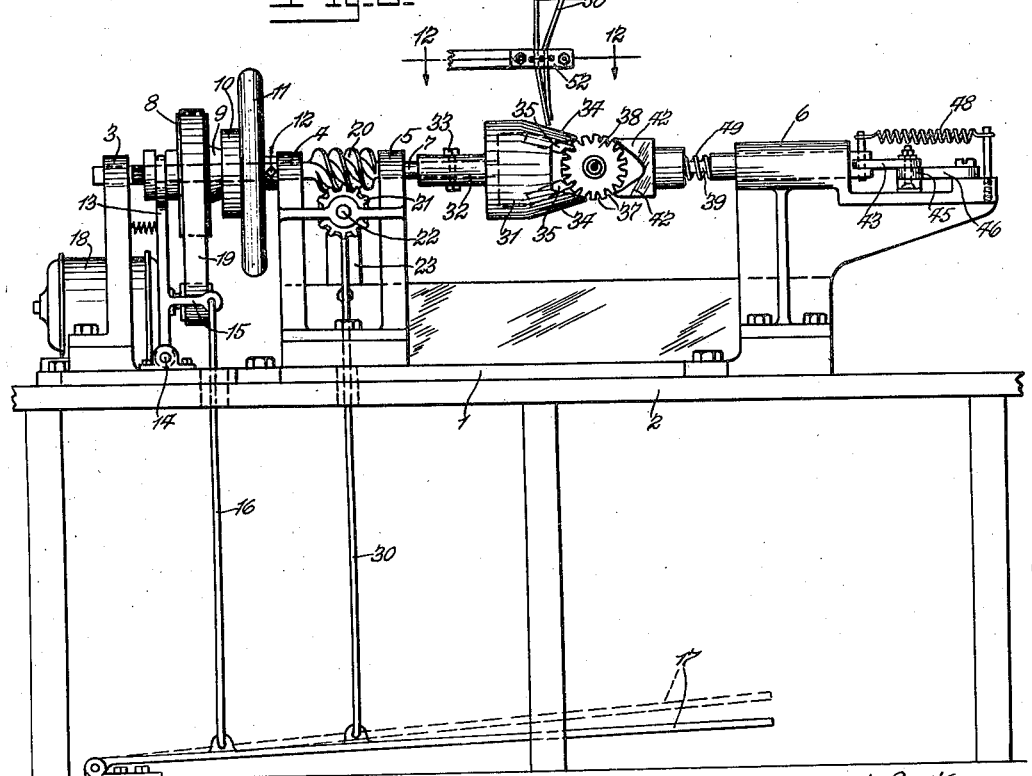
Fig. 2 is a side elevation.
Figure 9:
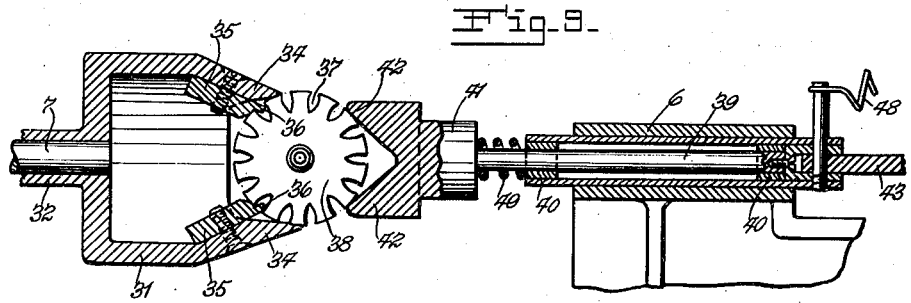
Fig. 9 is an enlarged sectional view on the line 9—9 of Fig. 1.
Figure 10:
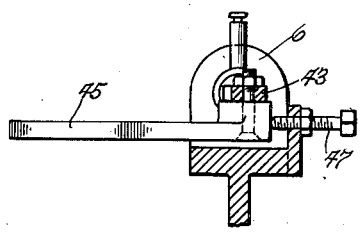
Fig. 10 is a cross sectional view of the toggle device on the line 10—10 of Fig. 1.
Figure 12:
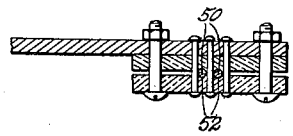
Fig. 12 is a sectional view on the line 12—12 of Fig. 2, showing details of the wire guide.
Figure 11:
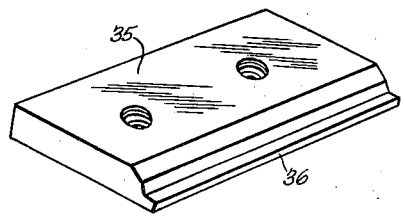
Fig. 11 is a perspective view of one of the gripper jaws detached from the supporting gripper member.

The machine comprises a base 1 mounted on a supporting frame or table 2 and having attached to one end spaced bearings 3, 4 and 5 and to the opposite end a bearing 6. These bearings are axially alined. A shaft 7 is journalled for rotation in the bearings 3, 4 and 5. A pulley 8 is mounted on the shaft 7 between the bearings 3 and 4 and is capable of longitudinal sliding movements and is also capable of rotation independently of said shaft and while said shaft remains stationary. One end of said pulley 8 is formed with a cone slip clutch member 9 movable into and out of clutching engagement with a cooperating clutch member 10 in rigid connection with a hand wheel 11 mounted on and attached to the shaft 7 by a fastener 12, so that the wheel 11 and shaft 7 must rotate together and are incapable of independent rotation. A bifurcated lever 13 engages the hub of the pulley 8, projecting oppositely from the clutch member 9. This lever 13 is supported on a pivot 14 and has an arm 15 extending laterally therefrom at an angle to the pivot 14 and pivotally connected with the upper end of a link 16, the lower end of which is pivoted to a pedal lever 17. Downward movement of the free end of the pedal lever 17 will operate the lever 13 and thereby move the pulley longitudinally along the shaft 7 and frictionally engage the clutch member 9 with the clutch member 10 in order to rotate the shaft 7. A motor 18 is mounted on the base 1 and is operatively connected by a belt 19 engaging the pulley 8, so that when the motor is operating the belt 19 will rotate the pulley 8. When the pulley 8 is in position in which the clutch member 9 is out of effective engagement with the clutch member 10, the pulley 8 will rotate about the shaft 7 while the shaft 7 remains stationary; and when the clutch member 9 is in effective engagement with the clutch member 10, the shaft 7 will be rotated by rotation of the pulley 8. This effective engagement of the clutch member 9 with the clutch member 10 is obtained by operating the pedal lever 17 downwardly from dotted line position (Fig. 2) to solid line position. When the pedal lever 17 is released, the clutch member 9 will spin out of effective engagement with the clutch member 10, or such movement of the clutch member 9 from effective engagement with the clutch member 10 may be otherwise obtained.

A spiral gear or worm 20 is rigid with the shaft 7 between the bearings 4 and 5 and engages a cooperating pinion 21 rigid on a shaft 22 supported in spaced bearings 23 secured to the base 1.

A cam 24 provided with an abrupt shoulder 25 is rigid with the shaft 22 and cooperates with a laterally extended end 26 of an angular lever 27, which is operatively supported on a pivot 28. A spring 29 is connected with the lever 27 in a manner to operate said lever in a direction to move the end 26 of the lever 27 away from the cam 24. A link 30 has its upper end pivoted to the lever 27 and its lower end pivoted to the pedal lever 17. Accordingly, when the pedal lever 17 is operated, the initial portion of said operation of the pedal lever 17 engages the clutch member 9 with the clutch member 10, thus and thereby rotating the shaft 7 before the end 26 of the lever 27 is moved into the path of the shoulder 25. The side of the high portion of the cam 24 is thereby placed opposite the end 26, so that said end 26 cannot move across the periphery of said cam. The shaft 7 will thereby be rotated a predetermined number of revolutions before the low point of the cam 24 comes opposite the end 26 to make it possible for the end 26 to move across the periphery of the cam 24. This ratio of rotation is obtained by the ratio of the gearing 20 and 21. Thus, the shaft 7 will be rotated a predetermined number of revolutions and will be in its exact starting position when the shoulder 25 engages the end 26 of the lever 27. About this time the operator releases the pedal lever 17. Such release of the pedal lever 17 may be slightly before the shoulder 25 engages the end 26, leaving the shaft 7 to rotate the remaining distance to its starting point by momentum. Stopping and starting of the shaft may be further expedited and facilitated by the operator by manual engagement and operation of the hand wheel 11.

A hollow gripper member 31 has a tubular extension 32 receiving the adjacent end of the shaft 7 and being attached to said shaft 7 by a fastener 33. The gripper member 31 is substantially oval in end elevation and has two converging rounded walls 34 in connection with its open end. A pair of cooperating gripper jaws 35 are attached to the inner sides of the converging walls 34 and are provided on their outer edges with lips 36 designed and adapted to engage in two of the longitudinal grooves 37 of an armature core 38 mounted in position to extend between the walls 34 with its axis at right angles to the axis of the shaft 7. The engagement of these lips 36 in the grooves 37 is exact and precise, so that the armature core 38 is held and supported in position in which the inclined surface of the walls 34 terminate at the adjacent walls of two grooves 37, so that the wires guided by the walls 34 will be forced to slide along the inclined surface of said walls and into the two grooves 37 with which said walls communicate.

Since the gripper member 31 is rotated exactly six revolutions from and to a predetermined starting position at each intermittent rotation thereof, it follows as a necessary consequence that the coils of the armature are wound six times about the armature core.

A shaft 39 is mounted for rotary and longitudinal sliding movements in the bearing 6, preferably being in bushings 40 supported by said bearing. The shaft 39 is axially alined with the shaft 7 and the body 41 of a gripper member is attached to the end of said shaft that is toward the shaft 7. The body 41 of the gripper member has spaced jaws 42 designed to receive between them a portion of the body of the armature core 38 and thus cooperate with the gripper member 31 and the lips 36 of the jaws 35 to support the armature core rigidly in the location in which it is placed.

The shaft 39 is movable longitudinally toward and away from the shaft 7. A link 43 has one end pivoted to the outer end of the shaft 39 and the opposite end pivoted by pin and slot connection 44 with the angle of an angular lever comprising a handle 45 and an arm 46. The outer end of the arm 46 is pivoted to an extension of the rigid bearing 6. Thus, the angular lever may be moved to the adjustment shown in Fig. 7 to extend the parts 43 and 46 to substantial longitudinal alinement and thereby move the shaft 39 longitudinally toward the shaft 7 to grip and hold the armature core 38 rigidly between the gripper members. In this position, the parts 43 and 46 extend slightly beyond alinement and engage an adjustable abutment 47. The handle member 45 may be operated to break this extended toggle by moving said handle member 45 to the position shown in Fig. 8. When this is done, a spring 48 acts to cooperate with the handle 45 to move the shaft 39 longitudinally away from the shaft 7. A yielding cushioning effect is obtained by a spring 49 mounted about the shaft 39 between the gripper body 41 and the bushing 40. These springs 48 and 49 prevent percussive impact of any of these operating parts when the handle 45 is operated to move the shaft 39 longitudinally in either direction.

The two wires 50 are supported on two spools 51 and are passed through friction guides 52 across the inclined walls 34 and engaged with the shaft 53 of the armature core in any appropriate way. This engagement may be in any one of many ways. Thereupon the pedal lever 17 is operated to engage the clutch member 9 effectively with the clutch member 10 and thereby rotate the shaft 7 a short distance before the lever 27 is operated by the link 30. Or this initial rotation of the shaft 7 may be obtained manually by rotating the wheel 11 a short distance before operating the pedal lever 17. Such initial rotation of the shaft 7 obviously rotates the high point 25 of the cam 24 beyond the end 26 of the lever 27 and permits the shaft 7 to continue to rotate the predetermined number of revolutions before the shoulder 25 engages the end 26 and stops further rotation of said shaft 7. In this way a predetermined number of windings of the wires 50 are placed in the two grooves into which the wires are passed by the inclined walls 34.

Then the toggle device, of which the handle 45 is a part, is operated to move the lever 39 longitudinally away from the lever 7. The armature 38 is then turned to place another pair of grooves in position to receive the wires passed thereto from the inclined walls 34 when the gripper member 31 is rotated as explained. This operation is repeated until the winding of the armature core is completed.

In the manually operated machine shown, a shaft 53' is journalled in bearings 54 and is equipped with a crank 55, whereby said shaft 53 may be easily rotated. A spiral gear 56 attached to the shaft 53 meshes with a spiral gear 57 rigid on a rotary shaft 58. The rotary shaft 58 is supported in bearings 59 and has rigid thereon a bevel gear 60 meshing with a bevel gear 61 on the lower end of a vertical shaft 62. The shaft 62 is rotative in a bearing 63 and has attached to its upper end a bevel pinion 64 meshing with a bevel pinion 65 attached to the end of a shaft 66 corresponding to the shaft 7 and journalled in the bearings 4 and 5. Thus, the shaft 66 terminates adjacent to the bearing 4 and this type of machine omits the wheel 11 and the clutch 10 and the power mechanism cooperating therewith to operate the machine.

If desired, a spiral gear 67 rigid on the shaft 66 may be meshed with a spiral gear 68 rigid on a shaft 69 corresponding to the shaft 22. If desired, these parts may be omitted from this modified type of machine.

The remaining construction of the machine, including the gripper heads and their associated parts, are the same as heretofore described, and similar reference characters are applied to similar parts in the drawings.

It is clear that the construction and arrangement of the various parts of this invention may be widely varied within the scope of equivalent limits without departure from the principle and spirit of the invention. I do not restrict myself in any unessential particulars, but what I claim and desire to secure by Letters Patent is:

1. A machine of the character described comprising two axially alined rotary shafts, mechanism for moving one of said shafts axially toward and from the other, a pair of spaced gripper jaws rigid with and diverging beyond the end of said axially movable shaft, a hollow gripper member rigidly attached to the other shaft, a pair of cooperating gripper jaws rigidly attached to the inner side of said gripper member adapted to engage in spaced longitudinal grooves of an armature core mounted between said pairs of gripper jaws, converging walls formed on said gripper member for guiding wires into spaced grooves in the armature core supported by said pairs of gripper jaws, and mechanism for rotating said shaft to which said gripper member is attached.

2. A machine of the character described comprising two axially alined rotary shafts, mechanism for moving one of said shafts axially toward and from the other shaft and for positively holding said one shaft in said position toward the other shaft, a pair of spaced gripper jaws rigid with said axially movable shaft, a hollow gripper member rigidly attached to said other shaft, a pair of gripper jaws rigidly attached to the inner side of said gripper member to engage in spaced longitudinal grooves of an armature core mounted between said pairs of gripper jaws, converging walls formed on said gripper member for guiding wires into spaced grooves in the armature core supported by the pairs of said gripper jaws, mechanism for rotating said shaft to which said gripper member is attached, a lever, connections operated by said lever controlling rotation of said shaft by said mechanism, and connections controlled by said lever for stopping rotation of said shaft.

3. A machine of the character described comprising a rotary shaft, mechanism for rotating said shaft, a hollow gripper member rigidly attached to one end of said shaft and having converging walls, a pair of converging gripper jaws attached to the inner sides of said walls adapted to engage in spaced grooves of an armature core, a rotary shaft supported for longitudinal movements towards and from said shaft, mechanism for moving said second shaft longitudinally toward said first shaft and holding said second shaft in said position, and a pair of gripper jaws rigid with said second shaft for cooperation with said first gripper jaws for engaging and supporting an armature core.

4. A machine of the character described comprising two axially alined shafts, gripper members attached to adjacent ends of said shafts, a pair of jaws rigid with each of said gripper members adapted to engage and support an armature core between said gripper members, wall elements for guiding wires into spaced grooves in an armature core supported by said jaws, mechanism for rotating one of said shafts, a control shaft geared to said one shaft, a cam attached to said control shaft, a lever operative to control rotation of said one shaft by said mechanism, a device engaging said cam to prevent rotation of said one shaft by said mechanism, and connections operated by said lever for moving said device to position to permit said mechanism to rotate said one shaft when said lever is operated.

5. A machine of the character described comprising two axially alined rotary shafts, mechanism for rotating one of said shafts from and to a definite starting position, manually operative means for stopping rotation of said one shaft in said definite starting position, a pair of spaced converging walls rigid with that end of said one shaft that is toward the other shaft, a pair of converging gripper jaws attached to the inner sides of said walls and adapted to engage in spaced longitudinal grooves of an armature core extending between said walls, and a pair of jaws attached to that end of the other shaft which is toward said gripper jaws adapted to engage the opposite side of said armature.

6. A machine of the character described comprising two axially alined rotary shafts, mechanism for rotating one of said shafts from and to a definite starting position, manually operative means for stopping rotation of said one shaft in said definite starting position, a pair of spaced converging walls rigid with that end of said one shaft that is toward the other shaft, a pair of converging gripper jaws attached to the inner sides of said walls and adapted to engage in spaced longitudinal grooves of an armature core extending between said walls, a pair of jaws attached to that end of the other shaft which is toward said gripper jaws adapted to engage the opposite side of said armature, a spring for moving said last named shaft axially from the other shaft, and manual means for moving said last named shaft and thereby said last named jaws toward said first named gripper jaws.

ROBERT L. PROBST.